Aug. 17, 1926.
C. E. GALLMAN ET AL
1,596,608
ROPE KNIFE AND ROPE SERVING DEVICE
Filed June 11, 1921      2 Sheets-Sheet 1
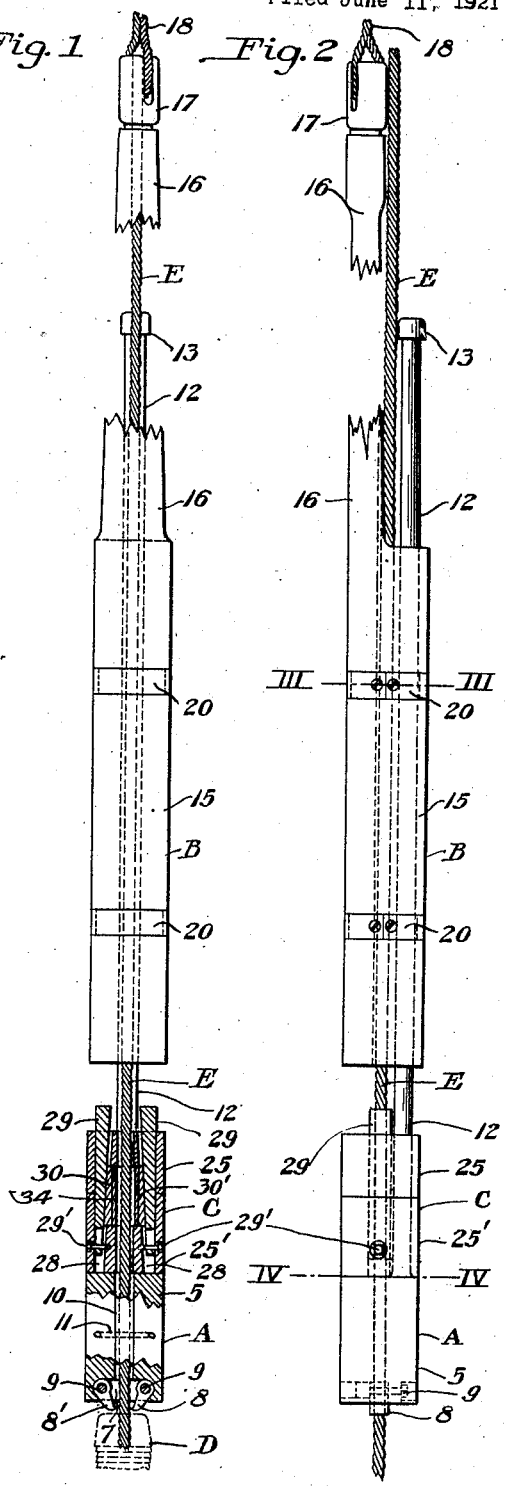
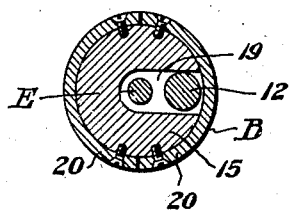
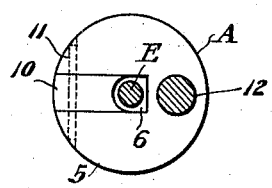
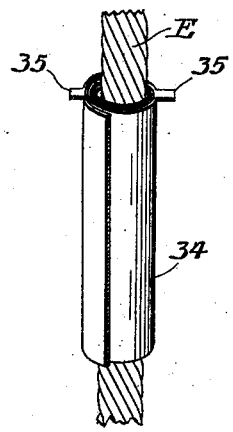
INVENTORS.
C. E. Gallman
Jack Harshaw
Frank S. Haire Aug. 17, 1926.
C. E. GALLMAN ET AL
ROPE KNIFE AND ROPE SERVING DEVICE
Filed June 11, 1921    2 Sheets-Sheet 2
1,596,608
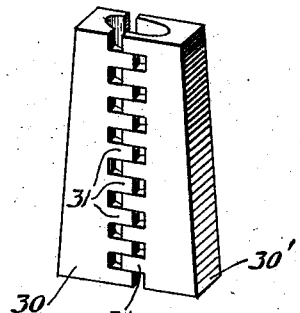
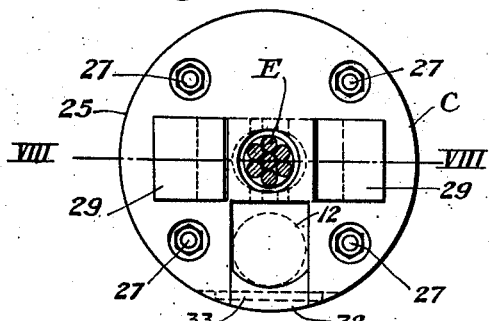
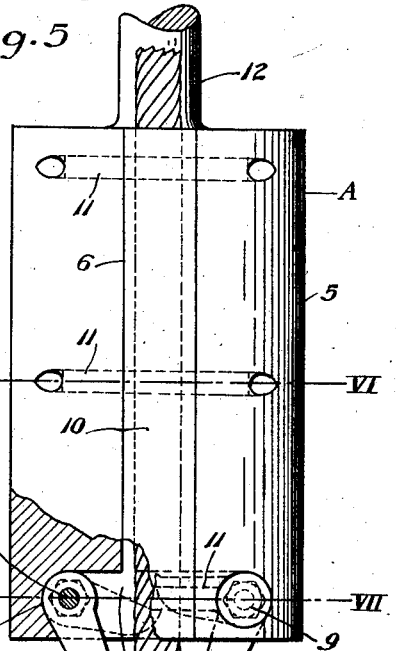
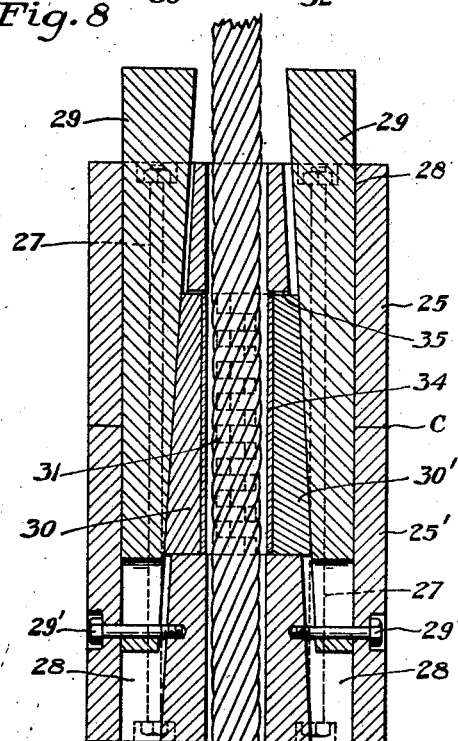
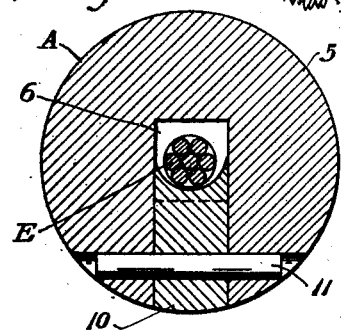
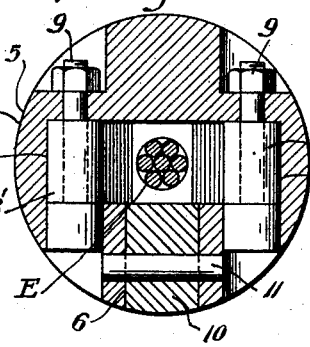
INVENTORS.

Patented Aug. 17, 1926.

1,596,608

UNITED STATES PATENT OFFICE.

CHARLES E. GALLMAN, JACK HARSHAW, AND FRANK S. HAIRE, OF TULSA, OKLAHOMA, ASSIGNORS TO OIL WELL SUPPLY COMPANY, OF PITTSBURGH, PENNSYLVANIA, A CORPORATION OF PENNSYLVANIA.

ROPE KNIFE AND ROPE-SERVING DEVICE.

Application filed June 11, 1921. Serial No. 476,920.

This invention relates to a rope knife for use in connection with well drilling apparatus, and to a rope serving device which may be used in combination therewith.

In drilling an oil or gas well, a string of tools often becomes stuck in the hole, and a fishing tool must be used to remove it. The upper member of the string of tools usually has a serrated surface or shouldered portion with which the fishing tool co-acts, and the rope from which the tools are suspended is also secured to a socket in the top of said upper member. It is impossible to pass any fishing tool down the hole and over the top of the upper member of the string of tools while the rope is in place. It is accordingly desirable to cut the rope as close to the socket as possible.

Furthermore, when the rope is being cut, it is under tension, and as soon as it is severed, the strands become loose and unravel, necessitating the cutting of the unraveled part, which is often approximately one hundred feet long.

One object of our invention is to provide a knife which will cut the rope at the very top of the socket. A further object of the invention is to provide a rope serving device in combination with a cutter, which will wrap the rope before it is cut and prevent the strands from unwinding, and so prevent loss of a portion of the rope being cut.

These and other objects will be apparent from the description of our invention in connection with the accompanying drawings, in which:

Fig. 1 is a view partly in section and partly in elevation of a combined cutter and serving device;

Fig. 2 is a side elevation of Fig. 1;

Fig. 3 is a section on line III—III of Fig. 2;

Fig. 4 is a section on line IV—IV of Fig. 2;

Fig. 5 is a view on a larger scale of the knife or cutting means only, showing it partly in section and partly in elevation;

Fig. 6 is a section on line VI—VI of Fig. 5;

Fig. 7 is a section on line VII—VII of Fig. 5;

Fig. 8 is a vertical section through the rope serving device;

Fig. 9 is a top view of the rope serving device in place about a rope or cable;

Fig. 10 is a perspective view of a part of the rope serving means;

Fig. 11 shows how the sheet of material for serving the rope is applied thereto.

In the drawings, A is the cutter; B, the bumper for operating the cutter; and C, the rope serving device. The top of a string of well boring tools is indicated at D, and E is the rope to be cut.

The cutter comprises a cylindrical block 5 having a longitudinal channel 6 cut therein. The channel is of sufficient depth to extend inwardly past the center of the block. As shown in Fig. 5, the bottom of the block is provided with a cut out portion or groove 7 in which are cutters 8 and 8' which have rounded top portions adapted to bear against the inside walls of the groove 7. They are pivotally carried and retained by bolts 9, arranged as shown in Fig. 7. This arrangement enables the rounded tops to bear against the inside walls of the groove 7 and and prevent shearing strain being placed on the bolts 9.

The heads and nuts on the bolts are arranged in recesses so that they do not project beyond the surface of the block. The cutters 8 and 8' normally hang in a substantially vertical position, though they are inclined slightly so that the lower cutting edges extend toward each other. The walls of the groove prevent them from swinging outwardly; but they may be swung inwardly to a substantially horizontal position, in which position the end of one cutter overlaps the other, as shown in dotted lines in Fig. 5.

A removable guide strip 10 adapted to fit into the longitudinal channel 6 is provided, said guide being removably held in position by pins 11 passing through holes in the body 5 and registering holes in the guide block 10. The ends of the pins are received in recesses so that they do not project beyond the sides of the body.

Projecting upwardly from the body 5 is a cylindrical stem 12 having a head 13 on the upper end thereof. The bumper block B comprises a cylindrical body 15 having an extension 16 extending upwardly at one side thereof. The body 15 is substantially the same diameter as the body of the cutter block 5. At the top of the extension 16 is a swivel joint 17 to which a rope or cable 18 for lowering the device into the well may be attached. A longitudinally extending groove 19 similar to groove 6 is provided in the body 15. This groove is adapted to receive the rope E from which the string of tools is suspended, and to receive and guide the stem 12 on the cutter block 5, as clearly shown in Figs. 2 and 3. Annular grooves may be provided at suitable places on the body 15 to receive the split retaining rings 20, as shown in Fig. 3. These retaining rings hold the parts in operative relation after they have been assembled about rope E.

In operation, body member 5 with the guide block or strip 10 removed, is applied to rope E, so that the rope is received in channel 6 and is between the cutters 8 and 8'. Guide strip 10 is then put into place and secured by the bolts or pins 11. The bumper block B is then put into place about the cable, with the rope E in groove 19. Then the stem 12 is inserted into the groove with the head 13 above the top of the main body portion. It will be understood that it is immaterial whether the cutter A or the bumper B is first applied. The straps or rings 20 are then secured in place to retain the parts in operative position.

The apparatus is then lowered into the well or hole by means of the rope or cable 18. The provision of the swivel 17 prevents the letting in rope 18 from winding about the rope E. When the cutters 8 and 8' contact with the top of the tool D, the downward movement of the cutting mechanism A will be checked, but member B will continue to move downwardly. It will bump or hit the top of block 5, and force the cutters 8 and 8' toward each other, severing the rope. If necessary, the bumper B may be moved up and down to deliver a series of blows to the top of block 5 to cut the rope. By reason of the cutters overlapping, it is ensured that all of the strands of the rope will be cut. Since the cutters 8 and 8' are in a recess in the bottom of the block 5, the rope will be cut at the very top of the tool socket.

As hereinbefore stated, it often happens that the strand of rope, when cut, will often unravel for a distance of as much as a hundred feet. In order to serve the rope at a point just above where it is cut, and before it is cut, our invention contemplates the use of the serving device C.

This serving device comprises a body, which, for the purpose of facilitating the manufacture thereof, is preferably formed of upper and lower sections 25 and 25', respectively. It could be formed integrally, however, or as a part of the cutter block or the bumper block. The upper and lower sections may be held together by longitudinally extending bolts 27. Guided in slots or openings 28, which extend throughout the length of the body, are wedges 29 which are retained in place by pins or bolts 29' passing through slots in the lower end thereof. Enclosed within the body and having faces which bear against the wedges, are two relatively movable clamping members 30 and 30' having concaved inner faces and interfitting fingers 31 on their edges. When the wedges are pushed downwardly, the two members 30 and 30' are forced together to clamp the rope. By reason of the concaved faces and the interfitting fingers, pressure is applied to all sides of the rope.

In order that the parts may be put around the rope, the body is formed with a channel at the side, which channel also serves to receive the stem 12 on the body 5. A guide strip 32 is removably held in place by pins or bolts 33. (See Fig. 9.)

In operation, the serving device is interposed between the cutting means A and the bumper B. A piece of serving material 34, such as thin sheet metal, is wrapped around the rope E at a suitable point, as shown in Fig. 11. This material may have laterally extending lugs 35. The two clamping blocks 30 and 30' are then applied around the material 34 so that the lugs 35 rest on the top of the blocks. Then the lower body member 25' is put into place, and the upper member 25 is applied, or vice versa, and the parts bolted together by bolts 27, after which wedges 29 are secured in place. The serving material is prevented from slipping out of place by lugs 35.

The combined structure is lowered into the well until the cutters engage the top of the tool D, as when the serving device is not used. The bumper B then drives wedges 29 down, forcing clamping members 30 and 30' together. This wraps the serving material tightly about the rope and holds it. The lugs 35 will bend inwardly against the sides of the rope as the serving of the rope is effected. When the wedges have been forced downwardly to the limit, motion will be transmitted through the serving means C to the cutter block 5, and the cutters will sever the rope, as hereinbefore described.

Obviously, various changes may be made in the cutting or serving apparatus, or in the way in which they are combined, and which are within the scope of our invention.

What we claim is:

1. A rope cutter for use in wells comprising a body having upper and lower ends, cutting means arranged on the lower end adapted to be operated by a blow on the body, a bumper associated with the body and movable relatively thereto arranged to deliver a blow to the body, means whereby the body and bumper block may be placed about the rope to be cut, and a swivel eccentrically carried by said bumper to which a cable may be connected for lowering the cutter into a well.

2. A rope cutter for use in wells comprising a body having upper and lower ends, horizontally pivoted cutters at the lower end of the body adapted to normally hang in a substantially vertical position but arranged to swing toward each other, means whereby a rope may be passed between the cutters, and means for effecting the actuation of the cutters, said cutters being adapted to overlap one another when closed to ensure the rope being completely cut.

3. A rope cutter for use in wells comprising a body having upper and lower ends with horizontally pivoted cutters at the lower end thereof adapted to be forced together upon the application of pressure to the top of the body, said body having a longitudinally extending channel therein, a stem extending up from the body eccentrically thereof, a bumper block having a channel therein adapted to receive the rope to be cut and the stem to slidably guide the stem and retain the cutter body in suspension therefrom, and means for attaching a letting in rope to the bumper block.

4. A rope cutter comprising a rope cutting member and a bumping block, means whereby they may be slidably applied to a rope to be cut, an eccentrically located vertical stem on the cutting member, means on the bumping block adapted to slidably receive and guide said stem of the cutting member whereby they may be moved longitudinally to each other, and means for attaching a letting-in rope to the bumper block.

5. The combination with a rope cutter, of a rope serving means cooperating therewith.

6. The combination with a rope cutter, of a rope serving means arranged to cooperate therewith and to serve the rope to be cut before the rope has been cut.

7. The combination with a rope cutter, of a rope serving means arranged to cooperate therewith, and means whereby the rope serving means may be actuated by the cutter actuating means.

8. The combination with a rope cutter including a cutting member having cutting means thereon and a bumper member for effecting the actuation of the cutting means, of a rope serving means arranged to cooperate therewith and adapted to be actuated by the bumper member.

9. The combination with a rope cutter including a member having cutting means thereon and a bumper arranged to effect the actuation of the cutting means, of a rope serving means interposed between the member which carries the cutters and the bumper and adapted to be actuated by the bumper.

10. The combination with a rope cutter including a lower member having cutting means thereon and an upper member movable relatively thereto and arranged to deliver a blow to the lower member to actuate the cutters, of a rope serving means arranged above the cutters and adapted to be actuated by the operation of the upper member.

11. The combination with a rope cutter including a cutter carrying member, a bumper member from which the cutter carrying member is slidably suspended, of an intermediate rope serving means having interfitting clamping members and wedges for moving the clamping members toward each other to bind about the rope, said wedges being arranged to be actuated by the movement of the bumper member.

In testimony whereof we affix our signatures.

CHARLES E. GALLMAN.
JACK HARSHAW.
FRANK S. HAIRE.